United States Patent [19]

Brenholt

[11] 4,353,587

[45] Oct. 12, 1982

[54] TRANSPORT VEHICLE ACCESSORY

[75] Inventor: David L. Brenholt, Dundas, Minn.

[73] Assignee: Donaldson Company, Inc., Minneapolis, Minn.

[21] Appl. No.: 192,321

[22] Filed: Sep. 29, 1980

[51] Int. Cl.³ ............................................. B62D 35/00
[52] U.S. Cl. .................................................... 296/15
[58] Field of Search ................. 296/15, 91; 105/2 R; 55/327

[56] References Cited

U.S. PATENT DOCUMENTS

| | | | |
|---|---|---|---|
| 3,854,769 | 12/1974 | Saunders | 296/15 |
| 3,929,369 | 12/1975 | Blair | 296/15 |
| 3,934,923 | 1/1976 | Lissaman | 296/15 |
| 3,987,862 | 10/1976 | Lidstone | 55/327 |
| 4,068,883 | 1/1978 | Meinecke et al. | 296/15 |
| 4,079,984 | 3/1978 | Powell | 296/15 |
| 4,093,300 | 6/1978 | Snizek | 296/15 |
| 4,142,758 | 3/1979 | Scaife | 296/15 |
| 4,208,197 | 6/1980 | Yakimowich et al. | 296/15 |

Primary Examiner—Richard A. Bertsch
Attorney, Agent, or Firm—Merchant, Gould, Smith, Edell, Welter & Schmidt

[57] ABSTRACT

An accessory for a traction vehicle having a power plant requiring inlet air and producing exhaust gas and a cab with a roof (21, 40) on which the accessory is to be secured in the air stream resulting from forward movement of the vehicle, the accessory being configured to interact with and direct the air stream so as to reduce the effective wind resistance of a load compartment behind the cab, and to produce in the stream sites of pressure higher and lower respectively than the pressure ambient to the vehicle, an inlet located at a site of high pressure for extracting from the stream air to be supplied to the power plant, and at least one outlet located at a site of lower pressure for discharging into the stream exhaust gases supplied by the power plant.

In one embodiment there are provided a pair of outlets (47) pivotable about a horizontal axis transverse of the cab roof.

14 Claims, 8 Drawing Figures

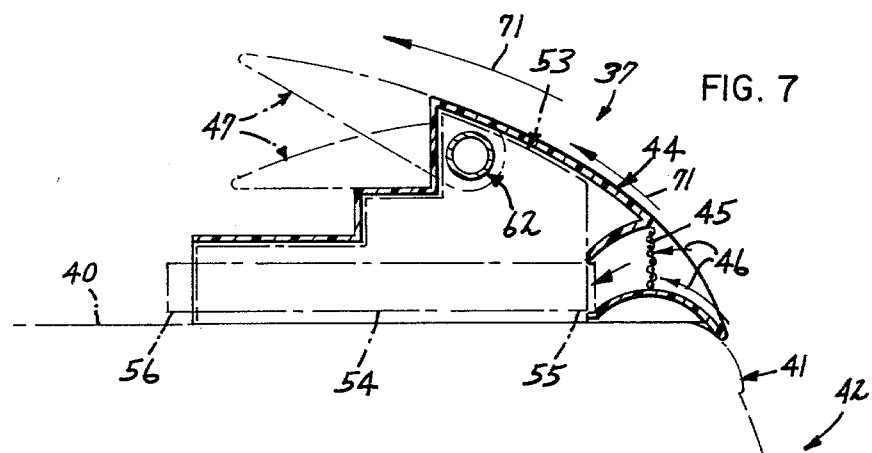
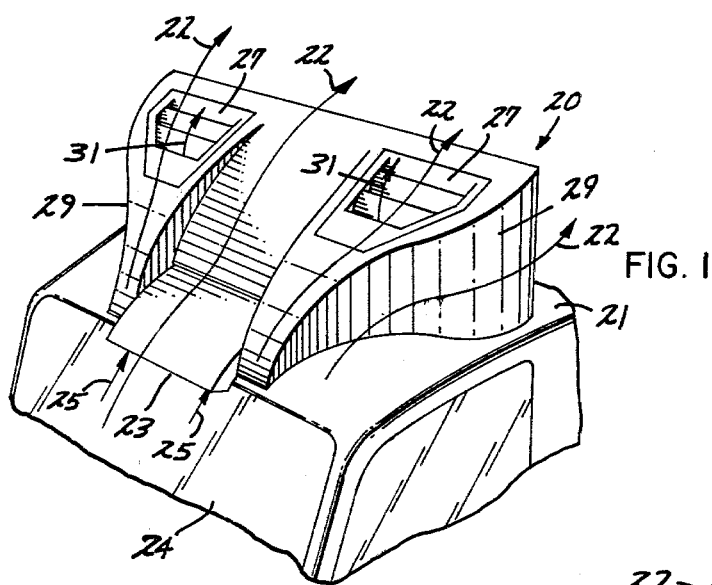
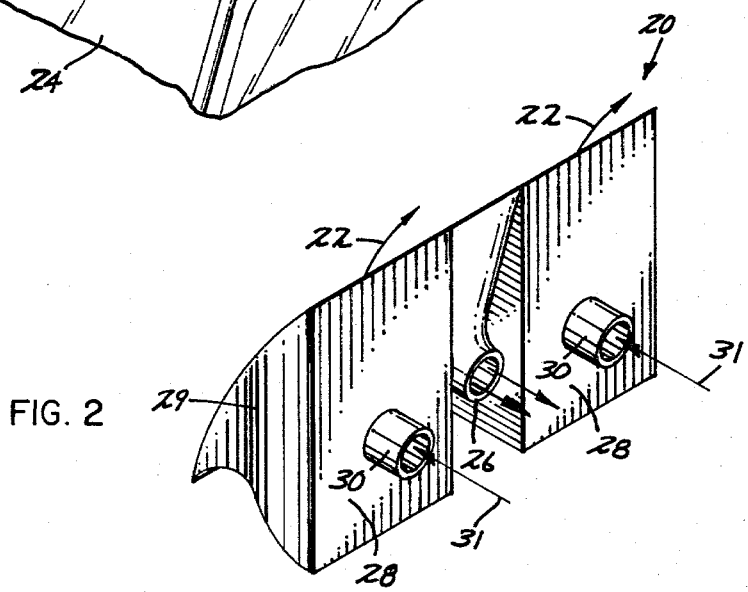

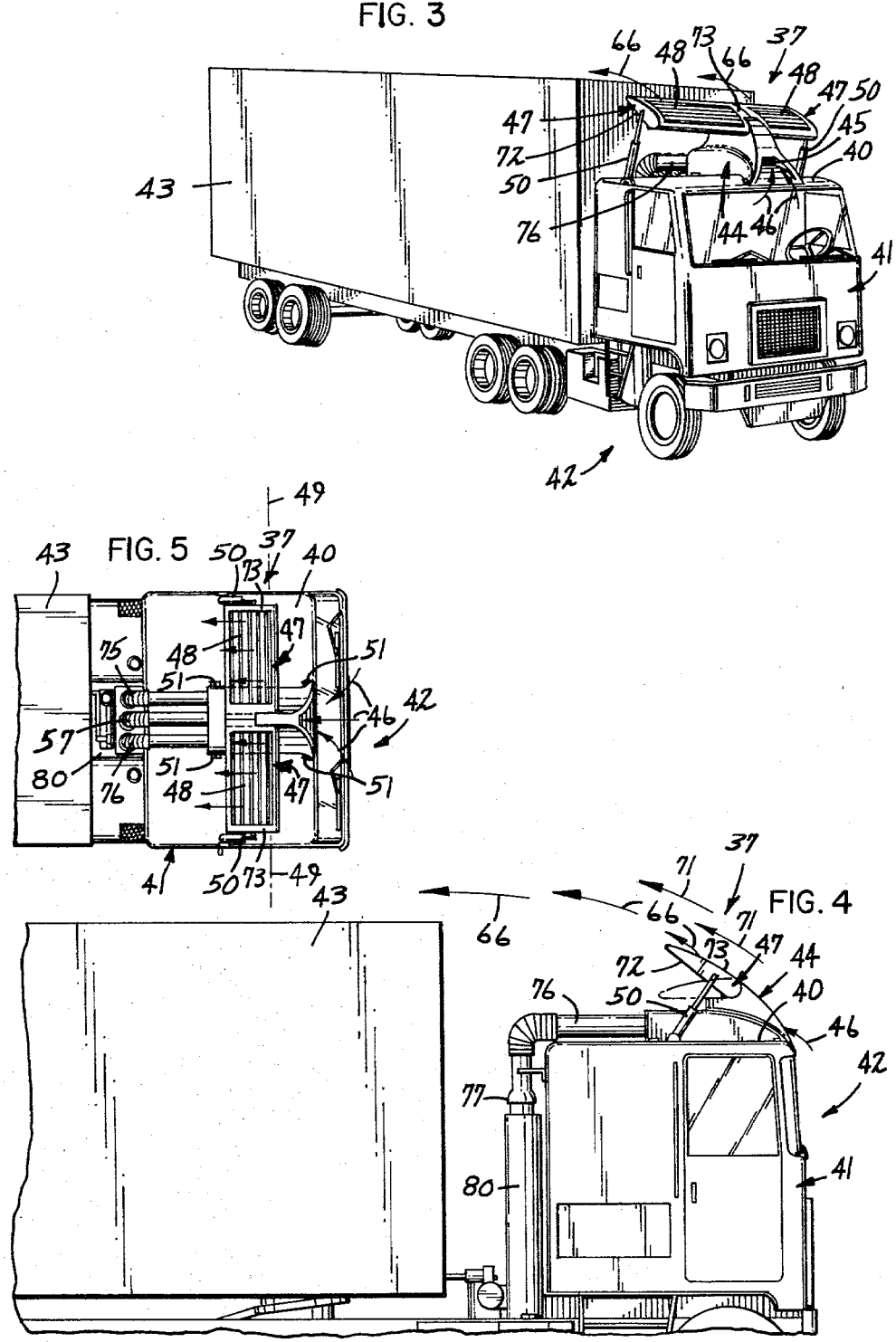

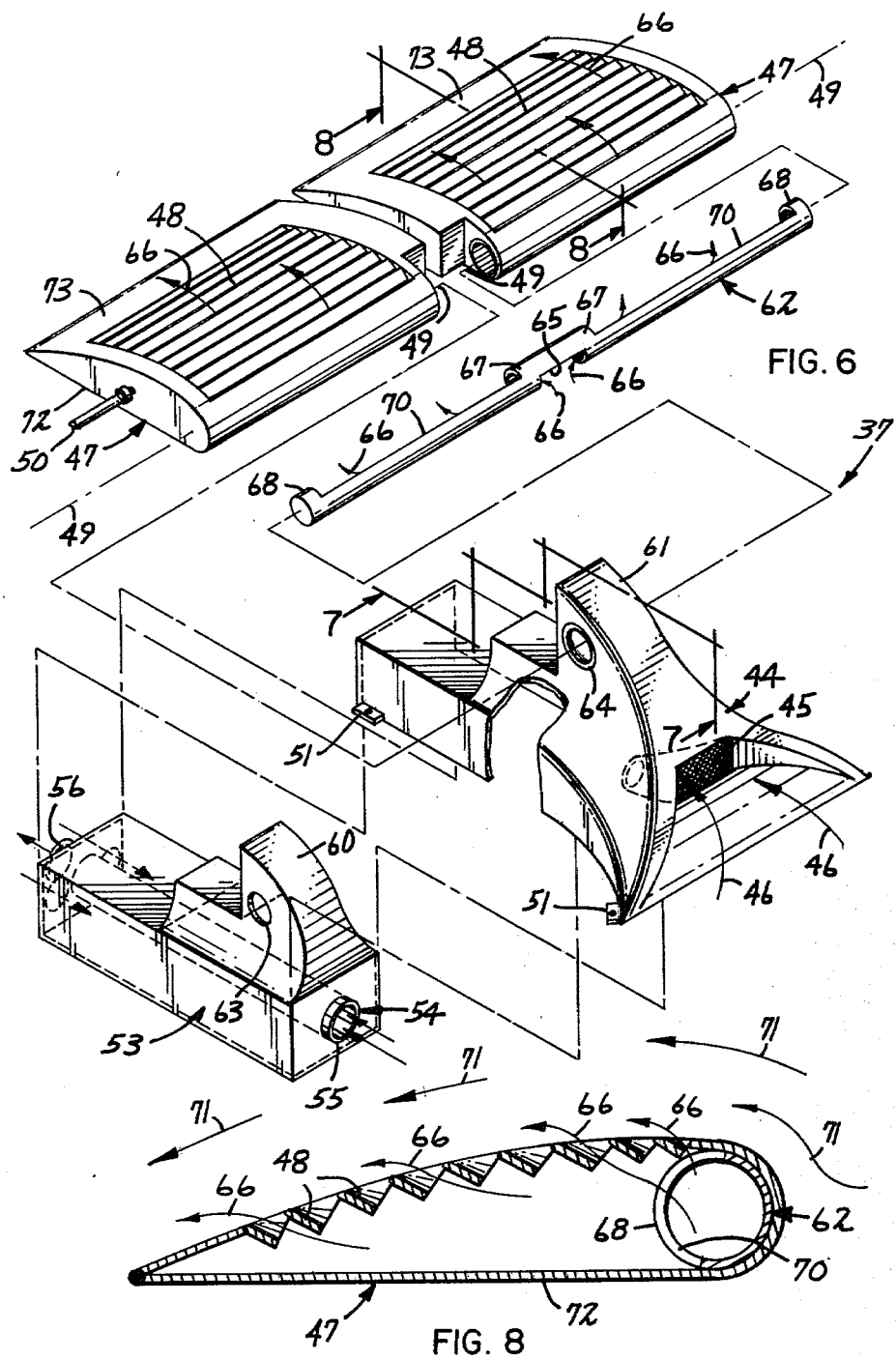

TRANSPORT VEHICLE ACCESSORY

TECHNICAL FIELD

This invention relates to the field of transportation, and particularly to an accessory for use on the roof of a truck or traction vehicle cab for combining a number of functions heretofore accomplished separately.

BACKGROUND OF THE INVENTION

Much of the transportation of present-day goods and raw materials is accomplished by "over-the-road" vehicles powered by internal combustion engines. The load may be carried in a truck body unitary with a power plant, or in a separate trailer drawn by a removable traction vehicle. It is conventional for the vehicle to include a cab for the driver which is unitary with the power plant: the tractor or truck body is taller than the cab and in order to maximize loading space has a square vertical front which offers very considerable wind resistance when the vehicle is in motion. Resort has been had to deflectors mounted on the cab roofs to modify the air flow so that the air stream passes above the front of the body or trailer instead of impinging directly on it.

It is also customary to conduct the products of combustion of the power plant to an exhaust pipe and muffler and discharge them at a height above the cab roof, and to draw air for the engine through an air cleaner from an inlet also elevated above the cab roof. Problems of sound generation and wind resistance are present, as is the need for special design to keep precipitation out of the inlet and exhaust system.

BRIEF SUMMARY OF THE INVENTION

The present invention comprises an accessory which makes use of the space above the roofs of vehicle cabs to not only reduce the wind resistance of a truck body or trailer, but to provide inlet air more efficiently to the air cleaner of the power plant, and to discharge exhaust gases quietly and efficiently. It includes a lower, central ram air inlet and a pair of upper, lateral exhaust gas discharge outlets, the latter, in one embodiment of the invention, being adjustable about a transverse horizontal axis to minimize the drag offered by the accessory itself when a traction vehicle is moving without drawing a trailer.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing, in which like reference numerals indicate corresponding parts throughout the several views, FIG. 1 shows in front perspective a first embodiment of an accessory according to the invention, mounted on the roof of a vehicle cab;

FIG. 2 is a rear view in perspective of the accessory of FIG. 1;

FIG. 3 is a perspective view of a tractor-trailer having a second embodiment of the invention mounted on the cab roof;

FIG. 4 is a fragmentary side view of the structure of FIG. 3;

FIG. 5 is a fragmentary plan view of the structure of FIG. 3;

FIG. 6 is an exploded view of the second embodiment of the accessory, to a larger scale;

FIG. 7 is a longitudinal sectional view taken along the line 7—7 of FIG. 6 to a different scale; and FIG. 8 is a sectional view taken along the line 8—8 of FIG. 6 to a different scale.

DESCRIPTION OF THE PREFERRED EMBODIMENT

Turning now to FIG. 1, an accessory 20 according to the invention is mounted on the roof 21 of the cab of a traction vehicle. The configuration of accessory 20 is such as to direct the air stream, resulting from forward vehicle motion, to flow above or beside the load compartment comprising a truck body or trailer behind the cab, as indicated by the arrows 22. Moreover the configuration of the accessory is also such as to interact with the air stream to produce a site of pressure higher than that ambient to the vehicle, and a plurality of sites of pressure lower than that ambient to the vehicle.

A lower, central ram air inlet 23 is provided just in front of and over the cab windshield 24, at the site of higher pressure, for admission of air as indicated by the arrows 25. A central rear outlet 26 receives the ram air and is adapted for connection by suitable conduit means to the air cleaner, and thence to the power plant inlet, not shown. Means may be provided ahead of any air cleaner for removing precipitation from the conduit. This arrangement replaces the conventional inlet stack, with its very considerable wind resistance.

A pair of upper, lateral outlet louvers 27 are also a part of accessory 20, and are located at sites of lower pressure; they open into a pair of independent outlet chambers 28 having rear inlets 30 to receive, through suitable conduit means which may include conventional mufflers, the power plant exhaust gases, indicated by the arrows 31, and to discharge them into the air stream. In this embodiment of the invention the outlet chambers 28 have relatively large volumes into which the exhaust gas may expand, which has a desirable sound muffling effect. If desired, louvers may also be provided in the sides 29 of the accessory, as well as or instead of on the upper surface, since sites of low pressure also exist at the sides of the accessory.

An improved accessory 37 according to the invention is shown in FIGS. 3-8 as mounted on the roof 40 of the cab 41 of a traction vehicle 42 drawing a trailer 43. While this disclosure is specific to a tractor-trailer vehicle, it is to be understood in what follows that the invention applies equally to a vehicle in which the load compartment is an integral truck body. Accessory 37 comprises a central unit 44, having a lower inlet 45 for ram air 46, and a pair of upper, lateral outlet chambers 47 having louvers 48. Chambers 47 are pivotable with respect to unit 44 about a transverse horizontal axis 49 and may be adjustably secured in rotated position by suitable mechanical supports 50.

As is best shown in FIG. 6, central unit 44 is provided with tabs 51 for securement to the cab roof 40. An exhaust manifold 53 is contained within unit 44, and is traversed without communication by an inlet conduit 54 positioned to be connected at one end 55 with ram air inlet 45 and at the other end 56 with a conduit 57 (FIG. 5) leading to the engine air cleaner and engine intake manifold. It will be appreciated that the exhaust manifold may be formed as an integral part of central unit 44 rather than as a separate component, in which case unit 44 itself becomes the exhaust manifold.

Unit 44 and manifold 53 are provided with interfitting upwardly projecting portions 60 and 61 respectively, bored in alignment to received a hollow shaft 62 which passes through apertures 63 in portion 60 and is pivotably contained in bearings 64 in portion 61, so that its axis is horizontal and transverse to the cab. A center portion of shaft 62 has a semicircumferential cutaway 65 to give egress of exhaust gas 66 from portion 60 of manifold 63 to the hollow of the shaft. Portions 67 of the shaft on each side of cutaway 65 are circumferentially complete to be received in bearings 64, and the ends 68 of the shaft may also be circumferentially complete and may be closed as well. Semicircumferential cutaways 70 are provided between portions 67 and ends 68, in 180° relationship to cutaway 65, to give egress of gas 66 from shaft 62 to outlet chambers 47, as best shown in FIG. 8. Each outlet chamber 47 is suitably secured to shaft 62 between a portion 67 and an end 68, so that pivotal movement of the outlets is accompanied by pivotal movement of the shaft to maintain a passage for exhaust gas from manifold 53 through portion 60, cutaway 65, the bore of shaft 62, and cutaways 70 to the outlet chambers 47 and thence through louvers 48 to the air stream 71, regardless of the positioning of chambers 47 by supports 50. As shown in FIG. 8, outlet chamber 47 is of an airfoil cross-section, its lower surface 72 being closed and its upper surface 73 including louvers 48 for discharge of exhaust gas upwardly into the air stream 71. The other outlet chamber is similarly constructed.

As shown in FIG. 5, the exhaust gases are supplied to the rear of manifold 53 through a pair of conduits 75 and 76. As suggested in FIG. 4, all of conduits 57, 75 and 76 are equipped with breakaway connections 77 to enablt tilting of the cab when access to the power plant is desired. If a single-exhaust power plant is being used, a Y-connection can be supplied to feed the exhaust gases to both chambers 47. The mufflers for the exhaust gas line, and the air cleaner for the intake, which are conventionally supplied, are suggested schematically by the entirety numeral 80, and are of course functionally independent.

In FIG. 4, chambers 47 are shown in solid lines in the positions in which they are supported when a trailer is being drawn: see also FIG. 5. When a tractor is moving without a trailer, that position of chambers 47 is one which offers high wind resistance, and under these conditions supports 50 are adjusted to bring chambers 47 into the broken line positions of FIG. 4, in which their wind resistance is considerably reduced. If the accessory is to be mounted on the cab roof of a truck, the positions of chambers 47 will not need to be altered.

From the foregoing it will be evident that I have invented an accessory for mounting on the roofs of the cabs of over-the-road vehicles which performs the functions of reducing the wind resistance of a trailer or truck body, of providing intake air to the power plant more efficiently, and of distributing exhaust gases from the power plant more quietly and effectively.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. An accessory, to be mounted on the cab roof of a traction vehicle having a power plant with inlet and exhaust conduits, to interact with and direct the air stream resulting from forward movement of the vehicle, said accessory including:
   means for directing the air stream so as to reduce the effective wind resistance of a load compartment behind the cab;
   a ram air inlet positioned in the path of said air stream;
   mean for connecting said inlet to said inlet conduit;
   at least one exhaust gas outlet positioned to discharge into said air stream; and
   means for connecting said outlet to said exhaust conduit.

2. An accessory according to claim 1 in which said outlet is pivoted for rotation about a transverse horizontal axis relative to the cab roof.

3. An accessory, for a traction vehicle having a cab with a roof and a power plant requiring inlet air, comprising, in combination:
   mounting means for securement of the accessory to the cab roof in the air stream resulting from forward movement of the vehicle;
   means for interacting with and directing the air stream so as to reduce the effective wind resistance of a load compartment behind the cab, said means being configured to produce in said stream a site of pressure higher than the pressure ambient to the vehicle; and
   inlet means located at a site of higher pressure for extracting from said stream air to be supplied to said power plant.

4. An accessory, for a traction vehicle having a cab with a roof and a power plant requiring inlet air and producing exhaust gas, comprising, in combination:
   mounting means for securement of the accessory to the cab roof in the air stream resulting from forward movement of the vehicle;
   means for interacting with and directing the air stream so as to reduce the effective wind resistance of a load compartment behind the cab, said means being configured to produce in said stream a site of pressure lower than the pressure ambient to the vehicle; and
   outlet means located at a site of lower pressure for discharging into said stream exhaust gases to be supplied by said power plant.

5. The structure of claim 4 including an exhaust expansion chamber within said accessory rearwardly of said means for interacting with the air and connected within said stream of exhaust gases leading to said outlet means.

6. The structure of claim 5 in which said outlet means comprises a pair of louvered openings in a wall of said accessory facing the air stream.

7. The structure of claim 6 including a ram air inlet in said wall to supply air to the power plant.

8. A traction vehicle having a cab with a roof and a power plant including air inlet means and exhaust gas outlet means;
   and an accessory mounted on said roof of said cab and configured to direct the air stream resulting from forward vehicle movement so as to reduce the effective wind resistance of a load compartment behind said cab, said accessory including a central, lower ram air inlet, a pair of lateral, upper exhaust gas outlets, means connecting said ram air inlet to supply air to said inlet means of said power plant, and means for conducting exhaust gas from said outlet means of said power plant to said outlet for discharge into said stream.

9. In combination:

a pair of hollow outlet chambers of airfoil cross section having upper surfaces with outlet louvers;

a hollow shaft having an axis;

means centrally pivoting said shaft for rotation about said axis;

means mounting said chambers on the ends of said shaft for pivotal movement therewith;

an exhaust manifold;

means for supplying exhaust gas to said manifold;

means including the pivoting means and the hollow shaft for conducting said gas from said manifold to said louvers regardless of the rotated position of said shaft;

and means for mounting said combination on the roof of a vehicle cab with said axis extending transversely and generally horizontally.

10. The combination of claim 9 in which the hollow shaft has a central semicircumferential cutaway for receiving the exhaust gas from said manifold and a pair of further semicircumferential cutaways oppositely spaced axially from said first cutaway and opening into said outlet chambers.

11. The combination of claim 9, and means for adjustably fixing the rotated position of said chambers and said shaft about said axis.

12. The combination of claim 9 including a ram air inlet in said pivoting means below said axis and an inlet pipe extending through said manifold and connected to said ram air inlet.

13. The combination of claim 9 in which said pivoting means is separate from and surrounds said manifold.

14. A structure according to claim 10 in which the cutaways of said shaft are spaced angularly by 180° around said axis.

* * * * *